United States Patent
Taninaka et al.

(10) Patent No.: US 10,724,776 B2
(45) Date of Patent: Jul. 28, 2020

(54) EXHAUST HEAT RECOVERY TYPE OF AIR-CONDITIONING APPARATUS

(71) Applicant: Mitsubishi Electric Corporation, Tokyo (JP)

(72) Inventors: Shingo Taninaka, Tokyo (JP); Shigeo Takata, Tokyo (JP); Naofumi Takenaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 16/076,056

(22) PCT Filed: Apr. 21, 2016

(86) PCT No.: PCT/JP2016/062665
§ 371 (c)(1),
(2) Date: Aug. 7, 2018

(87) PCT Pub. No.: WO2017/183160
PCT Pub. Date: Oct. 26, 2017

(65) Prior Publication Data
US 2019/0154320 A1    May 23, 2019

(51) Int. Cl.
*F25B 47/02* (2006.01)
*F25B 7/00* (2006.01)
(Continued)

(52) U.S. Cl.
CPC .............. *F25B 47/022* (2013.01); *F25B 6/04* (2013.01); *F25B 7/00* (2013.01); *F25B 13/00* (2013.01);
(Continued)

(58) Field of Classification Search
CPC ...... F25B 7/00; F25B 6/00; F25B 6/02; F25B 6/04; F25B 5/00; F25B 5/02; F25B 5/04;
(Continued)

(56) References Cited

U.S. PATENT DOCUMENTS

2008/0236185 A1* 10/2008 Choi .................. F25B 7/00
62/332
2009/0120117 A1* 5/2009 Martin ................ F25B 7/00
62/246
(Continued)

FOREIGN PATENT DOCUMENTS

JP    2000-179961 A    6/2000
JP    2001-280729 A    10/2001
(Continued)

OTHER PUBLICATIONS

Kukugan et al., Air Conditioning/Hot Water Supply System, Apr. 27, 2015, JPWO2013080297A1, Whole Document (Year: 2015).*
(Continued)

*Primary Examiner* — Larry L Furdge
(74) *Attorney, Agent, or Firm* — Posz Law Group, PLC

(57) ABSTRACT

An exhaust heat recovery type of air-conditioning apparatus includes: an air-conditioning-side refrigerant circuit including a first flow switching device, a second flow switching device, and an exhaust-heat recovery heat exchanger connected in parallel to an outdoor heat exchanger and an indoor heat exchanger; and a refrigeration-side refrigerant circuit. The first flow switching device causes the outdoor heat exchanger to communicate with one of a discharge side and a suction side of a first compressor through a pipe. The second flow switching device causes the indoor heat exchanger to communicate with one of the discharge and suction sides of the first compressor through a pipe. The exhaust-heat recovery heat exchanger is connected to the suction side of the first compressor through a pipe, and causes heat exchange between refrigerants. Because of the above configuration, the exhaust heat recovery type of air-conditioning apparatus can use exhaust heat in any of operation modes.

13 Claims, 10 Drawing Sheets

(51) Int. Cl.
*F25B 13/00* (2006.01)
*F25B 49/02* (2006.01)
*F25B 6/04* (2006.01)
*F25B 41/06* (2006.01)

(52) U.S. Cl.
CPC .......... *F25B 41/062* (2013.01); *F25B 47/025* (2013.01); *F25B 49/02* (2013.01); *F25B 2313/009* (2013.01); *F25B 2313/02732* (2013.01); *F25B 2313/0314* (2013.01); *F25B 2313/0315* (2013.01); *F25B 2500/19* (2013.01); *F25B 2600/2513* (2013.01); *F25B 2700/1931* (2013.01); *F25B 2700/1933* (2013.01); *F25B 2700/21151* (2013.01); *F25B 2700/21152* (2013.01); *Y02P 80/152* (2015.11)

(58) Field of Classification Search
CPC .................. F25B 47/022; F25B 41/062; F25B 2313/0315

See application file for complete search history.

(56) References Cited

U.S. PATENT DOCUMENTS

2013/0180276 A1* 7/2013 Choi ..................... F25B 7/00
62/190
2015/0191182 A1* 7/2015 Abou Eid .......... B61D 27/0018
62/335

FOREIGN PATENT DOCUMENTS

JP         2002-277098 A      9/2002
JP         WO2013080297 A1 *  4/2015

OTHER PUBLICATIONS

International Search Report ("ISR") dated Jul. 19, 2016 issued in corresponding International patent application No. PCT/JP2016/062665 (and English translation).

* cited by examiner

EXHAUST HEAT RECOVERY TYPE OF AIR-CONDITIONING APPARATUS

CROSS REFERENCE TO RELATED APPLICATION

This application is a U.S. national stage application of PCT/JP2016/062665 filed on Apr. 21, 2016, the contents of which are incorporated herein by reference.

TECHNICAL FIELD

The present invention relates to an exhaust heat recovery type of air-conditioning apparatus which recovers exhaust heat with a combination of a refrigeration apparatus and an air-conditioning apparatus.

BACKGROUND ART

Of exhaust heat recovery type of air-conditioning apparatuses of related art, exhaust heat recovery type of air-conditioning apparatuses are present which adopt a dual refrigeration circuit obtained by combining, for example, a refrigeration apparatus and an air-conditioning apparatus (see, for example, patent literature 1). In such an exhaust heat recovery type of air-conditioning apparatus, an exhaust-heat recovery heat exchanger in which an evaporator of an air-conditioning apparatus and a condenser of a refrigeration apparatus are arranged in parallel to each other recovers exhaust heat from the refrigeration apparatus by performing heat exchange between refrigerant in the air-conditioning apparatus and refrigerant in the refrigeration apparatus.

CITATION LIST

Patent Literature

Patent Literature 1: Japanese Patent Unexamined Patent Application Publication No. 2000-179961

SUMMARY OF INVENTION

Technical Problem

In the exhaust heat recovery type of air-conditioning apparatus described in patent literature 1, the exhaust-heat recovery heat exchanger is connected in series to an outdoor heat exchanger of the air-conditioning apparatus. Thus, although the exhaust-heat recovery heat exchanger can recover exhaust heat from the refrigeration apparatus in a heating operation of the air-conditioning apparatus, it cannot recovery heat from the refrigeration apparatus in a cooling operation of the air-conditioning apparatus since high-pressure refrigerants from those apparatuses are made to pass through the exhaust-heat recovery heat exchanger. Therefore a defrost operation is applied in the heating operation, in general, an operation control is performed such that a circulation direction of refrigerant is reversed in cycle. Therefore, the outdoor heat exchanger of the air-conditioning apparatus and the exhaust-heat recovery heat exchanger both function as a high-pressure side, and thus exhaust heat from the refrigeration apparatus cannot be effectively used in the defrost operation.

The present invention has been made to solve the above problem, and an object of the invention is to provide an exhaust heat recovery type of air-conditioning apparatus capable of effectively using exhaust heat without being restricted in accordance with an operation mode.

Solution to Problem

An exhaust heat recovery type of air-conditioning apparatus according to one embodiment of the present invention includes: an air-conditioning-side refrigerant circuit in which a first compressor, a first flow switching device, an outdoor heat exchanger, a first expansion device, an indoor heat exchanger and a second flow switching device are connected by pipes, and an exhaust-heat recovery heat exchanger is connected in parallel to the outdoor heat exchanger and the indoor heat exchanger by pipes; and a refrigeration-side refrigerant circuit in which a second compressor, the exhaust-heat recovery heat exchanger, a refrigeration-side expansion device and a cooler are connected by pipes. The first flow switching device is provided between the outdoor heat exchanger and the exhaust-heat recovery heat exchanger, and causes the outdoor heat exchanger to communicate with any one of a discharge side and a suction side of the first compressor through a pipe. The second flow switching device is provided between the indoor heat exchanger and the exhaust-heat recovery heat exchanger, and causes the indoor heat exchanger to communicate with any one of the discharge and suction sides of the first compressor through a pipe. The exhaust-heat recovery heat exchanger is connected to the suction side of the first compressor by a pipe in the air-conditioning-side refrigerant circuit, and causes heat exchange to be performed between refrigerant in the air-conditioning-side refrigerant circuit and refrigerant in the refrigeration-side refrigerant circuit.

Advantageous Effects of Invention

In an exhaust-heat recovery heat exchanger of one embodiment of the present invention, whichever operation mode is entered, an exhaust-heat recovery heat exchanger can cause heat exchange to be performed between low-pressure refrigerant in an air-conditioning-side refrigerant circuit and high-pressure refrigerant in a refrigeration-side refrigerant circuit. Therefore, an exhaust heat recovery type of air-conditioning apparatus can improve its coefficient of performance (COP) as a complex system of a refrigeration apparatus and an air-conditioning apparatus.

DESCRIPTION OF EMBODIMENTS

Embodiment 1

Figure 1:
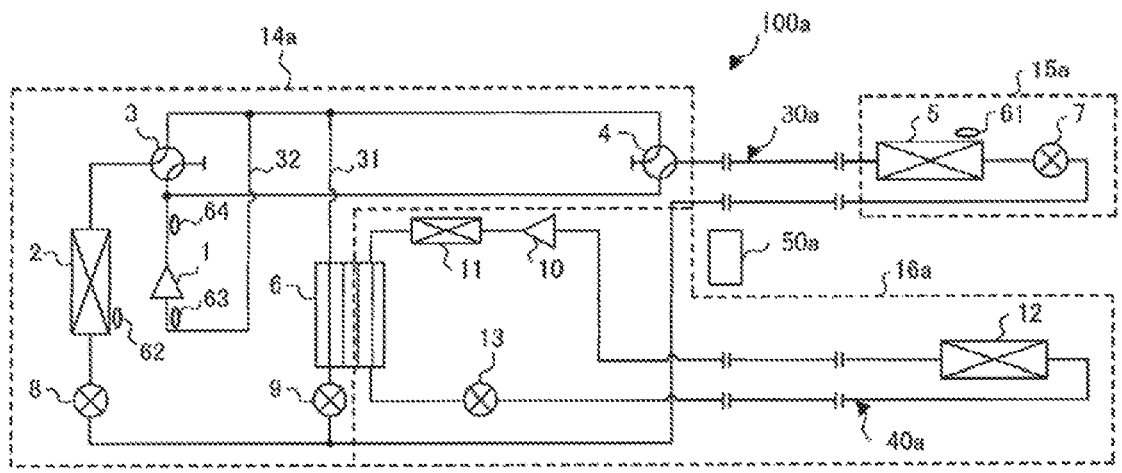
FIG. 1 is a schematic circuit diagram illustrating an exhaust heat recovery type of air-conditioning apparatus according to embodiment 1.

FIG. 1 is a schematic circuit diagram illustrating an exhaust heat recovery type of air-conditioning apparatus according to embodiment 1. A device configuration of an exhaust heat recovery type of air-conditioning apparatus 100a will be described with reference to FIG. 1.
(Device Configuration)

The exhaust heat recovery type of air-conditioning apparatus 100a according to embodiment 1 includes an air-conditioning-side refrigerant circuit 30a and a refrigeration-side refrigerant circuit 40a. In the air-conditioning-side refrigerant circuit 30a, a first compressor 1, a first flow switching device 3, an outdoor heat exchanger 2, a first expansion device 7, an indoor heat exchanger 5, and a second flow switching device 4 are sequentially connected by refrigerant pipes. In the air-conditioning-side refrigerant circuit 30a, an exhaust-heat recovery heat exchanger 6 is connected in parallel to the outdoor heat exchanger 2 and the indoor heat exchanger 5 by a refrigerant pipe extending from a pipe between the outdoor heat exchanger 2 and the indoor heat exchanger 5. This refrigerant pipe extends through the exhaust-heat recovery heat exchanger 6, and joins a pipe connected to the suction side of the first compressor 1. The refrigerant pipe extending through the exhaust-heat recovery heat exchanger 6 will hereinafter be referred to as an exhaust heat recovery path 31.

In the refrigeration-side refrigerant circuit 40a, a second compressor 10, a condenser 11, the exhaust-heat recovery heat exchanger 6, a refrigeration-side expansion device 13 and a cooler 12 are sequentially connected by refrigerant pipes. The exhaust-heat recovery heat exchanger 6 is a heat exchanger connecting two refrigerant circuits in a dual circuit configuration, and is a cascade condenser having both the function of an evaporator in a high-temperature-side cycle and the function of a condenser in a low-temperature-side cycle. As illustrated in FIG. 1, since the exhaust-heat recovery heat exchanger 6 includes a portion corresponding to an evaporator of the air-conditioning-side refrigerant circuit 30a and a portion corresponding to a condenser of the refrigeration-side refrigerant circuit 40a, heat exchange is performed between refrigerants, whereby exhaust heat is recovered from the refrigeration-side refrigerant circuit 40a to the air-conditioning-side refrigerant circuit 30a.

The first compressor 1 and the second compressor 10 are, for example, scroll compressors, and compress refrigerant vapor. The first compressor 1 is located on a compressor path 32 formed by connecting, with a refrigerant pipe, two points on an annular path on which the first flow switching device 3 and the second flow switching device 4 are connected to each other by refrigerant pipes. In other words, the first compressor 1 is connected in parallel to the first flow switching device 3 and the second flow switching device 4 by the refrigerant pipes.

The outdoor heat exchanger 2, the indoor heat exchanger 5, the condenser 11, and the cooler 12 are, for example, fin tube heat exchangers, and exchange heat with surrounding air. The indoor heat exchanger 5 exchanges heat with air in a room which is a to-be-air-conditioned space. The indoor heat exchanger 5 functions as a condenser when the air-conditioning apparatus is set to perform a heating operation, and functions as an evaporator when it is set to perform a cooling operation. The cooler 12 exchanges heat with air in an interior which is a to-be-cooled space.

The first flow switching device 3 is provided between the outdoor heat exchanger 2 and the exhaust-heat recovery heat exchanger 6, and the second flow switching device 4 is provided between the indoor heat exchanger 5 and the exhaust-heat recovery heat exchanger 6. The first flow switching device 3 and the second flow switching device 4 are, for example, a four-way valve or a three-way valve. Three ports of the first flow switching device 3 are connected to the discharge and suction sides of the first compressor 1 and the outdoor heat exchanger 2 by refrigerant pipes, respectively. Three ports of the second flow switching device 4 are connected to the discharge and suction sides of the first compressor 1 and the indoor heat exchanger 5 by refrigerant pipes, respectively. Using such a circuit configuration, the first flow switching device 3 causes the outdoor heat exchanger 2 to communicate with one of the discharge and suction sides of the first compressor 1, and the second flow switching device 4 causes the indoor heat exchanger 5 to communicate with one of the discharge and suction sides of the first compressor 1.

The first expansion device 7 and the refrigeration-side expansion device 13 are decompression units which depressurize refrigerant, and are, for example, electronic expansion valves. Also, expansion devices may be respectively provided on intermediate-pressure sides of the outdoor heat exchanger 2, the indoor heat exchanger 5 and the exhaust-heat recovery heat exchanger 6 which are connected in parallel to each other in the air-conditioning-side refrigerant circuit 30a. To be more specific, the first expansion device 7 is provided for the indoor heat exchanger 5, and changes the flow rate of refrigerant which flows to the indoor heat exchanger 5; and a second expansion device 8 is provided for the outdoor heat exchanger 2, and changes the flow rate of refrigerant which flows to the outdoor heat exchanger 2.

A third expansion device 9 is provided on the exhaust heat recovery path 31 on which the exhaust-heat recovery heat exchanger 6 is provided, and changes the flow rate of refrigerant which flows to the exhaust-heat recovery heat exchanger 6.

Components of the refrigerant circuits are mounted on, for example, an outdoor unit 14*a*, an air-conditioning indoor unit 15*a* or a refrigeration apparatus 16*a*. In embodiment 1, the outdoor unit 14*a* includes the first compressor 1, the first flow switching device 3, the outdoor heat exchanger 2, the second expansion device 8, the second flow switching device 4, the exhaust-heat recovery heat exchanger 6 and the third expansion device 9. The air-conditioning indoor unit 15*a* includes the indoor heat exchanger 5 and the first expansion device 7. The refrigeration apparatus 16*a* includes the second compressor 10, the condenser 11, the exhaust-heat recovery heat exchanger 6, the refrigeration-side expansion device 13 and the cooler 12. As illustrated by solid lines in FIG. 1, the components are connected to each other by refrigerant pipes.

The exhaust heat recovery type of air-conditioning apparatus 100*a* further includes a controller 50*a*. The controller 50*a* is made up of, for example, a control board or a microcomputer, etc., and is also connected to the components by, for example, signal lines. The controller 50*a* controls the air-conditioning-side refrigerant circuit 30*a* and the refrigeration-side refrigerant circuit 40*a* in accordance with a set operation mode. The exhaust heat recovery type of air-conditioning apparatus 100*a* has a plurality of operation modes. The plurality of operation modes are distinguishably stored in the controller 50*a* in advance as combinations of, for example, port connections of the first flow switching device 3 and the second flow switching device 4 and opening/closing of the first expansion device 7, the second expansion device 8 and the third expansion device 9. The controller 50*a* adjusts expansion opening degrees of the first expansion device 7, the second expansion device 8 and the third expansion device 9 to perform control such that refrigerant becomes liquid refrigerant whose degree of supercooling is set in advance, at a refrigerant pipe part where an intermediate pressure is set between pressures at two expansion stages to which expansion devices are connected. However, when an instruction to fully close an expansion device is issued by the controller 50*a*, the expansion device is fully closed in response to the instruction.

In the exhaust heat recovery type of air-conditioning apparatus 100*a*, sensors 61, 62, 63 and 64 such as temperature sensors or pressure sensors are installed to measure, temperatures of the inside of the room and the pipes. The controller 50*a* acquires information from the sensors 61, 62, 63 and 64, and performs control in accordance with, for example, environment conditions and a load. In embodiment 1, the sensor 61 is installed at the indoor heat exchanger 5; the sensor 62 is installed at the outdoor heat exchanger 2; the sensor 63 is installed on the suction side of the first compressor 1; and the sensor 64 is installed on the discharge side of the first compressor 1. The controller 50*a* is formed capable of acquiring information such as temperature, the degree of superheat and the degree of supercooling.

Figure 2:
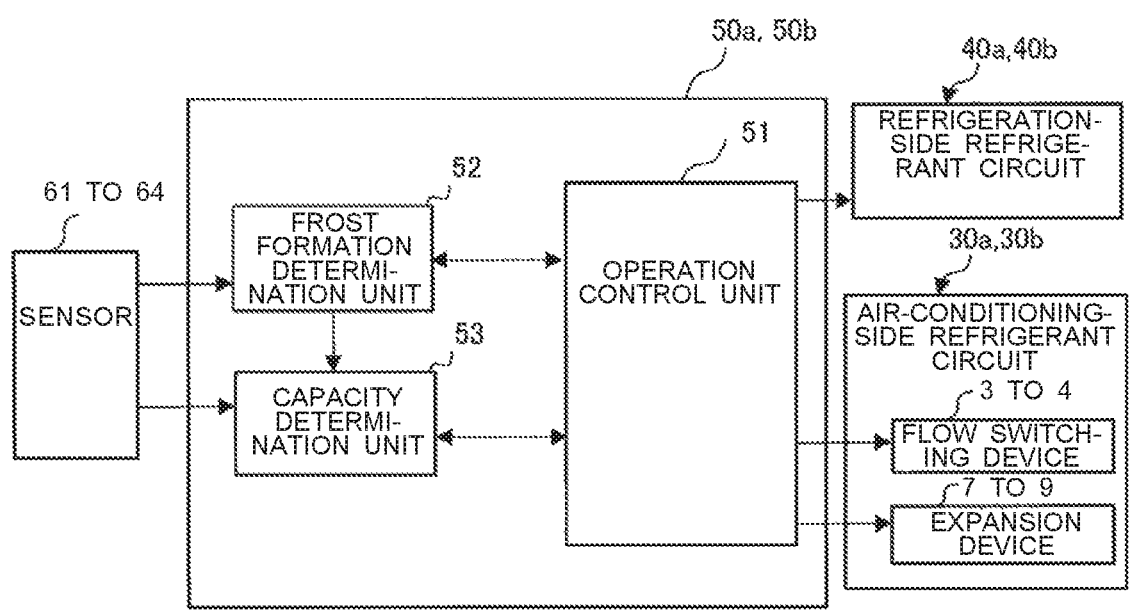
FIG. 2 is a functional block diagram of a controller according to each of embodiments 1 and 2.

FIG. 2 is a functional block diagram of the controller according to each of embodiments 1 and 2. The controller 50*a* includes an operation control unit 51, a frost formation determination unit 52 and a capacity determination unit 53. The operation control unit 51 performs main operation control of the air-conditioning-side refrigerant circuit 30*a* and the refrigeration-side refrigerant circuit 40*a*. The operation control unit manages the operation state of each of the air-conditioning apparatus and the refrigeration apparatus 16*a*. The operation state is, for example, the heating operation, the cooling operation or a stopped state of the air-conditioning operation of the air-conditioning apparatus, and the cooling operation or a stopped state thereof of the refrigeration apparatus 16*a*.

In the heating operation, the frost formation determination unit 52 acquires information from, for example, the sensor 62, and determines whether frost is formed at the outdoor heat exchanger 2 or not. In this determination, any determination method may be applied as long as it makes it possible to determine whether frost is formed at the outdoor heat exchanger 2 or not. For example, the frost formation determination unit 52 may determine whether frost is formed or not based on the evaporating temperature of refrigerant or by comparing the temperature measured by the sensor 62 with a set threshold. As such a frost formation determination method, that of a well-known technique can also be applied.

The capacity determination unit 53 acquires information from the sensors 61, 62, 63, and 64, and determines whether a capacity condition and a capacity threshold condition are satisfied. The capacity condition in the heating operation is a condition that the condensation capacity of the air-conditioning-side refrigerant circuit 30*a* is smaller than the necessary evaporation capacity of the refrigeration-side refrigerant circuit 40*a*. The capacity condition in the cooling operation is a condition that the condensation capacity of the air-conditioning-side refrigerant circuit 30*a* is larger than the necessary evaporation capacity. The condensation capacity of the air-conditioning-side refrigerant circuit 30*a* is, for example, the degree of supercooling at the indoor heat exchanger 5, and may be determined with a well-known technique. For example, with respect to the degree of supercooling in the heating operation, temperature sensors are installed at an inlet and an outlet through which refrigerant for the indoor heat exchanger 5 passes, and the temperatures of the inlet and the outlet are measured by the temperature sensors, as a result of which the degree of supercooling in the heating operation can be determined from the difference between the temperatures of the inlet and the outlet. Furthermore, the necessary evaporation capacity of the refrigeration-side refrigerant circuit 40*a* is, for example, a target degree of superheat at the outlet of the cooler 12, which is necessary for keeping the temperature of an interior where the refrigeration apparatus 16*a* is installed, at a set temperature. The target degree of superheat may be, for example, a fixed value obtained by conducting an experiment or the like on the to-be-cooled space, or may be determined by making a calculation in accordance with a load change based on the temperature of the to-be-cooled space.

In the heating operation, the capacity determination unit 53 determines whether the capacity threshold condition that the condensation capacity reaches a set threshold is satisfied or not. The set threshold is an upper limit of the condensation capacity, and is a threshold set in advance in accordance with the capacity of the air-conditioning apparatus, which includes, for example, the capacity of the first compressor 1. Thus, the capacity determination unit 53 can make the determination by comparing, for example, the degree of supercooling at the indoor heat exchanger 5 with the set threshold.

(Operation)

Figure 3:
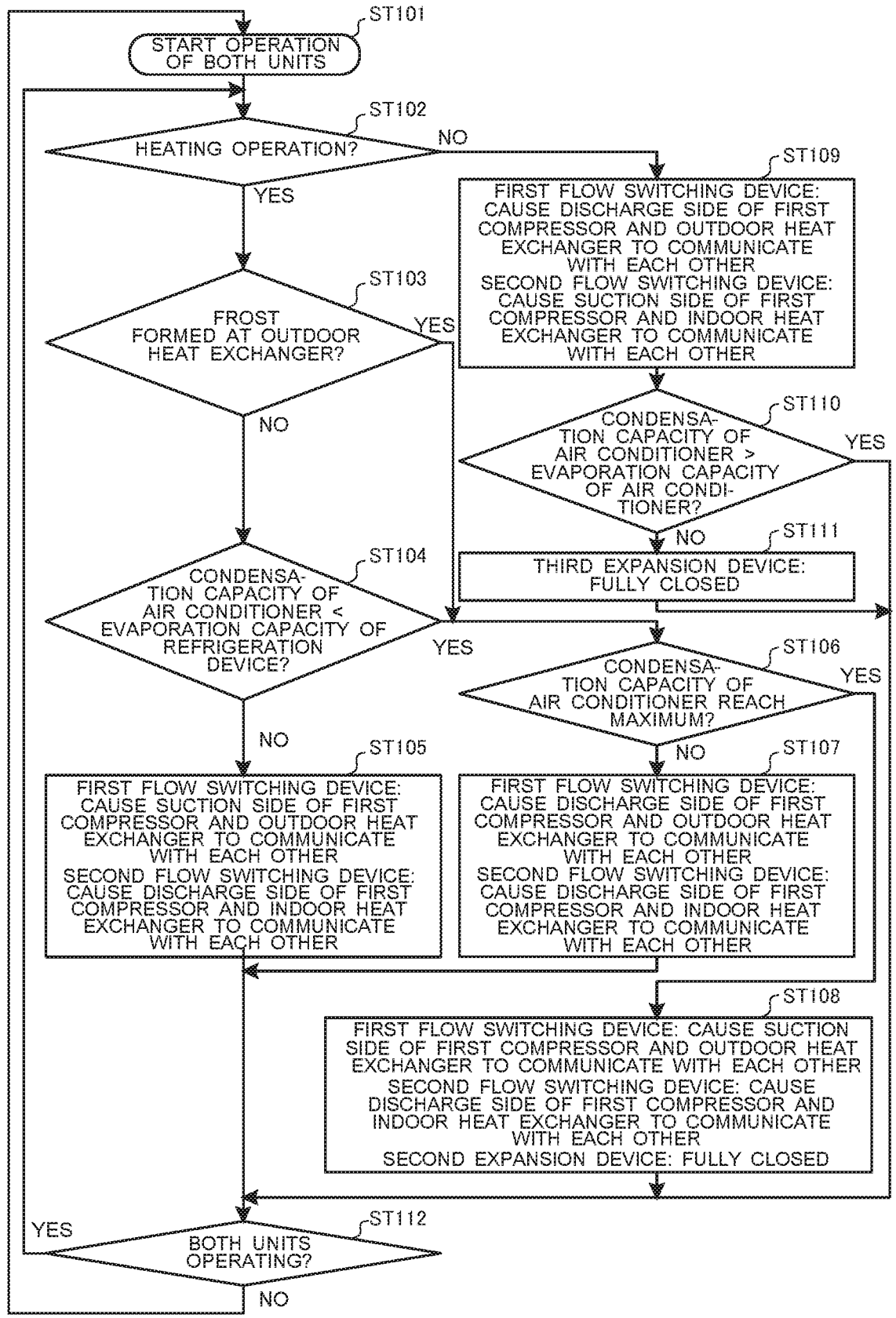
FIG. 3 is a flowchart illustrating the flow of steps of operation of the exhaust heat recovery type of air-conditioning apparatus according to embodiment 1.

FIG. 3 is a flowchart illustrating a flow of steps which are carried out in an operation of the exhaust heat recovery type of air-conditioning apparatus 100*a* according to embodiment 1. It will be explained how the controller 50a performs control in each of operation modes. When both units, that is, the air-conditioning apparatus and the refrigeration apparatus 16a, are powered up (step ST101), an exhaust-heat recovery control is started. When the exhaust-heat recovery control is started, the controller 50a determines whether or not the operation mode of the air-conditioning apparatus is a heating operation mode in which the heating operation is performed (step ST102).

(Operation in Heating Operation Mode)

Figure 4:
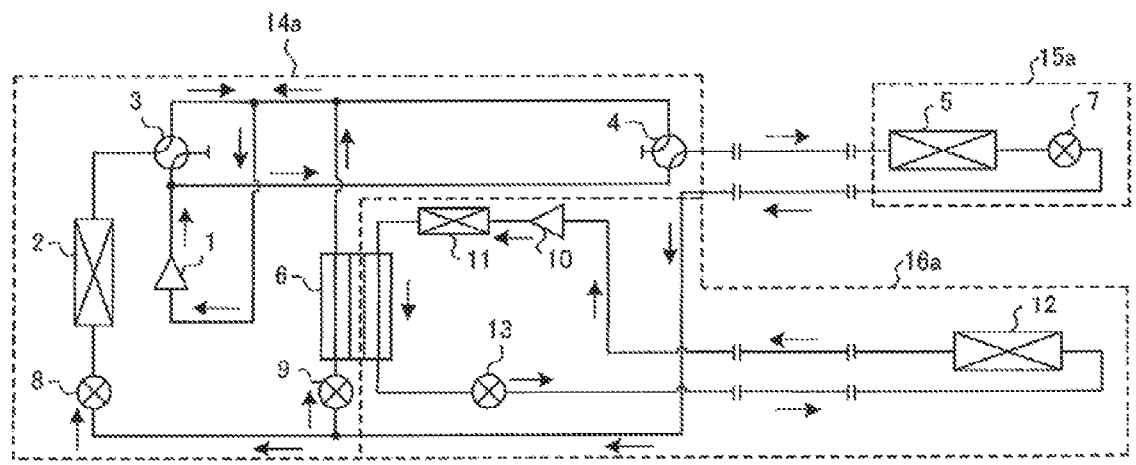
FIG. 4 is an explanatory diagram illustrating an example of the flow of refrigerant in a normal heating mode as indicated in FIG. 3, according to embodiment 1.
Figure 5:
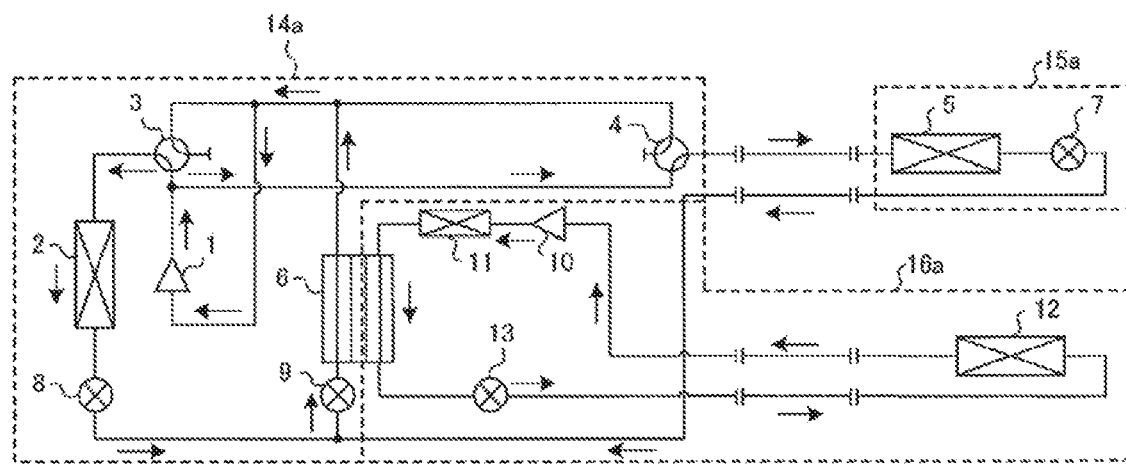
FIG. 5 is an explanatory diagram illustrating an example of the flow of refrigerant in a hot-gas defrost mode as indicated in FIG. 3, according to embodiment 1.
Figure 6:
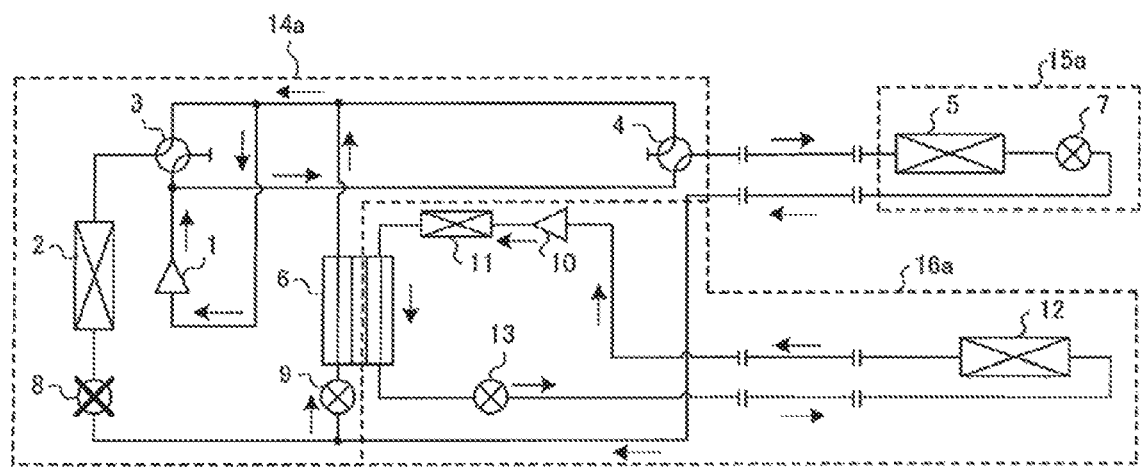
FIG. 6 is an explanatory diagram illustrating an example of the flow of refrigerant in an off-cycle defrost mode as indicated in FIG. 3, according to embodiment 1.

It will be described with reference to FIGS. 3 to 6 what operation is performed in the case where the operation mode is the heating operation mode. FIG. 4 is an explanatory diagram illustrating an example of a flow of refrigerant in a normal heating mode as indicated in FIG. 3, according to embodiment 1. FIG. 5 is an explanatory diagram illustrating an example of a flow of refrigerant in a hot-gas defrost mode as indicated in FIG. 3, according to embodiment 1. FIG. 6 is an explanatory diagram illustrating an example of a flow of refrigerant in an off-cycle defrost mode as indicated in FIG. 3, according to embodiment 1. In FIGS. 4 to 6, flows of refrigerant are indicated by arrows, and an expansion device instructed to be fully closed is marked with a cross.

In the case where the heating operation is performed by the operation control unit 51 (Yes in step ST102), the frost formation determination unit 52 determines whether frost is formed at the outdoor heat exchanger 2 or not (step ST103). In the case where a condition to be checked in step ST103 is not satisfied, that is, in the case where frost is not formed (No in step ST103), the capacity determination unit 53 determines whether the condensation capacity of the air-conditioning apparatus is smaller than the necessary evaporation capacity of the refrigeration apparatus 16a (step ST104).

Subsequently, in the case where the condition to be checked in step ST103, i.e., the above frost formation condition, is satisfied (Yes in step ST103), the capacity determination unit 53 determines whether the condensation capacity of the air-conditioning apparatus reaches the upper limit or not (step ST106). Furthermore, in the case where the capacity condition to be checked in step ST104 is satisfied (Yes in step ST104), the controller 50a also proceeds to step ST106. In the case where neither the capacity condition nor the frost formation condition is satisfied (No in step ST104), the operation control unit 51 causes the normal heating mode to be entered, by controlling the first flow switching device 3 and the second flow switching device 4 as illustrated in FIG. 4. Specifically, the first flow switching device 3 causes the refrigerant suction side of the first compressor 1 and the outdoor heat exchanger 2 to communicate with each other, and the second flow switching device 4 causes the refrigerant discharge side of the first compressor 1 and the indoor heat exchanger 5 to communicate with each other (step ST105). Thereby, the outdoor heat exchanger 2 functions as an evaporator, and the indoor heat exchanger 5 functions as a condenser. The exhaust-heat recovery heat exchanger 6 functions as an evaporator of the air-conditioning-side refrigerant circuit 30a. That is, in the heating operation, the controller 50a causes low-pressure refrigerant in the air-conditioning-side refrigerant circuit 30a and high-pressure refrigerant in the refrigeration-side refrigerant circuit 40a to flow to the exhaust-heat recovery heat exchanger 6, to thereby achieve recovery of exhaust heat from the refrigeration apparatus 16a.

By contrast, in the case where the condensation capacity of the air-conditioning apparatus is smaller than the necessary evaporation capacity of the refrigeration apparatus 16a (Yes in step ST104), the capacity determination unit 53 further determines whether or not the air-conditioning apparatus is operated, with its condensation capacity reaching the upper limit (step ST106). In the case where frost is formed at the outdoor heat exchanger 2 (Yes in step ST103), the determination in step ST106 is also made. In the case where in step ST106, the capacity determination unit 53 determines that the condensation capacity is smaller than the condensation capacity upper limit, that is, the capacity of the air-conditioning apparatus is still sufficient (No in step ST106), the operation control unit 51 causes the hot-gas defrost mode to be entered, by controlling the first flow switching device 3 and the second flow switching device 4, as illustrated in FIG. 5. To be more specific, the first flow switching device 3 causes the refrigerant discharge side of the first compressor 1 and the outdoor heat exchanger 2 to communicate with each other, and the second flow switching device 4 causes the refrigerant discharge side of the first compressor 1 and the indoor heat exchanger 5 to communicate with each other (step ST107). As a result, the outdoor heat exchanger 2 and the indoor heat exchanger 5 both function as condensers, heating in the room is maintained, and high-temperature refrigerant flows to the outdoor heat exchanger 2 and defrosting is thus performed. The exhaust-heat recovery heat exchanger 6 functions as the evaporator of the air-conditioning-side refrigerant circuit 30a, and recovers exhaust heat from the refrigeration apparatus 16a.

By contrast, in the case where it is determined that the air-conditioning apparatus is operated, with its condensation capacity reaching the upper limit (Yes in step ST106), that is, an air-conditioning load is great with respect to the capacity of the air-conditioning apparatus, and the condensation capacity is insufficient, the operation control unit 51 causes the off-cycle defrost mode to be entered, by controlling the first flow switching device 3, the second flow switching device 4 and the second expansion device 8, as illustrated in FIG. 6. To be more specific, the first flow switching device 3 causes the refrigerant suction side of the first compressor 1 and the outdoor heat exchanger 2 to communicate with each other, the second flow switching device 4 causes the refrigerant discharge side of the first compressor 1 and the indoor heat exchanger 5 to communicate with each other, and the second expansion device 8 is fully closed (step ST108). Thereby, the indoor heat exchanger 5 functions as the condenser, the heating operation is continued, and thus low-temperature refrigerant does not flow to the outdoor heat exchanger 2. The exhaust-heat recovery heat exchanger 6 functions as the evaporator of the air-conditioning-side refrigerant circuit 30a, and recovers exhaust heat from the refrigeration apparatus 16a.

(Operation in Cooling Operation Mode)

Figure 7:
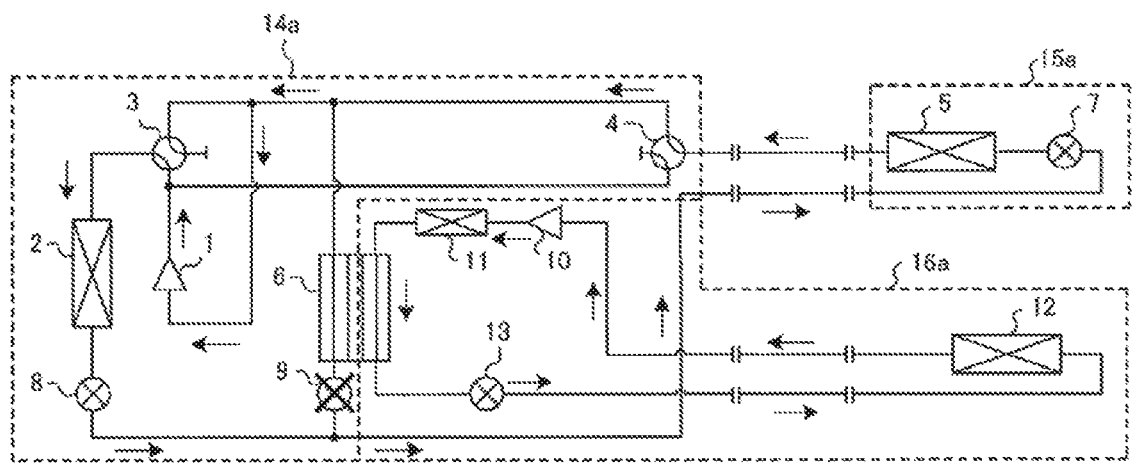
FIG. 7 is an explanatory diagram illustrating an example of the flow of refrigerant in a prioritized cooling mode as indicated in FIG. 3, according to embodiment 1.
Figure 8:
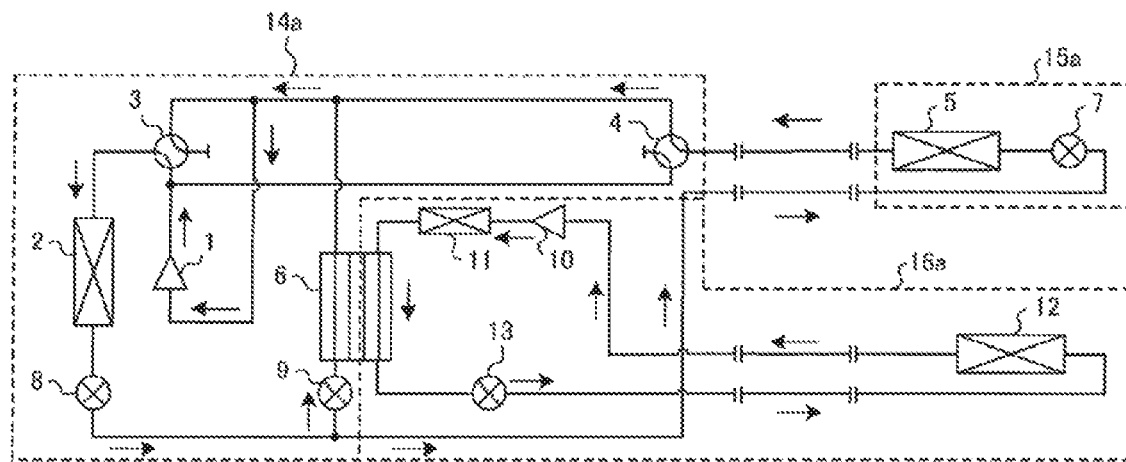
FIG. 8 is an explanatory diagram illustrating an example of the flow of refrigerant in a shared cooling mode as indicated in FIG. 3, according to Embodiment 1.

It will be explained with reference to FIG. 3 and FIGS. 7 to 8 what operation is performed in the case where the air-conditioning apparatus is in a cooling operation mode in which the cooling operation is performed. FIG. 7 is an explanatory diagram illustrating an example of the flow of refrigerant in a prioritized cooling mode as indicated in FIG. 3, according to embodiment 1. FIG. 8 is an explanatory diagram illustrating an example of the flow of refrigerant in a shared cooling mode as indicated in FIG. 3, according to embodiment 1.

In the case where the operation mode of the air-conditioning apparatus is the cooling operation mode (No in step ST102), the operation control unit 51 controls the first flow switching device 3 and the second flow switching device 4. The first flow switching device 3 causes the refrigerant discharge side of the first compressor 1 and the outdoor heat exchanger 2 to communicate with each other, and the second flow switching device 4 causes the refrigerant suction side of the first compressor 1 and the indoor heat exchanger 5 to communicate with each other (step ST109). Subsequently, the capacity determination unit 53 determines whether or not the capacity condition that the condensation capacity of the air-conditioning apparatus is larger than the necessary evaporation capacity is satisfied (step ST110). In the case where it is determined that the condensation capacity of the air-conditioning apparatus is not larger than the necessary evaporation capacity (No in step ST110), that is, the capacity of the air-conditioning apparatus is insufficient to recover exhaust heat from the refrigeration apparatus 16a, the operation control unit 51 causes the third expansion device to be fully closed, and causes the prioritized cooling mode to be entered, as illustrated in FIG. 7 (step ST111). Accordingly, in the air-conditioning-side refrigerant circuit 30a, the outdoor heat exchanger 2 functions as the condenser, and the indoor heat exchanger 5 functions as the evaporator. Furthermore, the refrigerant in the air-conditioning-side refrigerant circuit 30a does not flow to the exhaust-heat recovery heat exchanger 6, and only the refrigerant in the refrigeration-side refrigerant circuit 40a circulates therein.

By contrast, in the case where the capacity determination unit 53 determines that the condensation capacity of the air-conditioning apparatus is larger than the necessary evaporation capacity (Yes in step ST110), a connection state of the air-conditioning-side refrigerant circuit 30a is a connection state controlled in step ST109 as illustrated in FIG. 8. The third expansion device 9 is not instructed to be fully closed, and the opening degree thereof is thus adjusted. In this case, the operation control unit 51 may control the opening degree of the third expansion device 9 such that the greater the difference between the condensation capacity of the air-conditioning apparatus and the necessary evaporation capacity, the greater the opening degree of the expansion device 9. In the case where "Yes" is determined in step ST110, the outdoor heat exchanger 2 functions as the condenser, and the indoor heat exchanger 5 functions as the evaporator. The exhaust-heat recovery heat exchanger 6 also functions as the evaporator of the air-conditioning apparatus, and recovers exhaust heat from the refrigeration apparatus 16a.

After performing the control in each of step ST105, step ST107, step ST108, step ST111, and "Yes" in step ST110, the controller 50a checks the operation states of both units (step ST112). When both units are still in operation (Yes in step ST112), the step to be carried out is returned to step ST102 of determining the operation of the air-conditioning apparatus, and the exhaust-heat recovery control is continued. In the case where simultaneous operation of the both units ends, the exhaust-heat recovery control as illustrated in FIG. 3 also ends (No in step ST112).

In embodiment 1, since the air-conditioning apparatus and the refrigeration apparatus 16a each include two specific heat exchangers, they can be independently operated even when the operation of one of the air-conditioning apparatus and the refrigeration apparatus 16a is stopped. In the case where the operation of the refrigeration apparatus 16a is in a stopped state, the third expansion device 9 is controlled to be fully closed.

In consideration of the heat exchange at the exhaust-heat recovery heat exchanger 6, the controller 50a adjusts the condensation capacity of the condenser 11 such that the degree of supercooling (subcool) at the inlet of the refrigeration-side expansion device 13 in the refrigeration apparatus 16a reaches a predetermined degree of supercooling (subcool). Even in the case where the exhaust-heat recovery heat exchanger 6 does not function, the cooling function of the refrigeration apparatus 16a is maintained, although exhaust heat is not recovered from the refrigeration apparatus 16a.

It should be noted that it is explained above that in embodiment 1, the second flow switching device 4 is provided in the outdoor unit 14a; however, it may be provided close to the indoor heat exchanger 5. Also, a plurality of air-conditioning indoor units 15a may be disposed at a stage subsequent to the second flow switching device 4. In this case, it suffices that each of the plurality of air-conditioning indoor units 15a is made up of a set of a second flow switching device 4, an indoor heat exchanger 5 and a first expansion device 7, and the plurality of air-conditioning indoor units 15a are connected in parallel to each other.

In such a manner, the exhaust heat recovery type of air-conditioning apparatus 100a of embodiment 1 includes: the air-conditioning-side refrigerant circuit 30a in which the first compressor 1, the first flow switching device 3, the outdoor heat exchanger 2, the first expansion device 7, the indoor heat exchanger 5 and the second flow switching device 4 are connected by the pipes, and the exhaust-heat recovery heat exchanger 6 is connected in parallel to both the outdoor heat exchanger 2 and the indoor heat exchanger 5 by the pipes; and the refrigeration-side refrigerant circuit 40a in which the second compressor 10, the exhaust-heat recovery heat exchanger 6, the refrigeration-side expansion device 13 and the cooler 12 are connected to each other by the pipes. The first flow switching device 3 is provided between the outdoor heat exchanger 2 and the exhaust-heat recovery heat exchanger 6, and cause the outdoor heat exchanger 2 to communicate with one of the discharge and suction sides of the first compressor 1 through the pipe. The second flow switching device 4 is provided between the indoor heat exchanger 5 and the exhaust-heat recovery heat exchanger 6, and causes the indoor heat exchanger 5 to communicate with one of the discharge and suction sides of the first compressor 1 through the pipe. The exhaust-heat recovery heat exchanger 6 is connected to the suction side of the first compressor 1 by the pipe in the air-conditioning-side refrigerant circuit 30a, and performs heat exchange between refrigerant in the air-conditioning-side refrigerant circuit 30a and refrigerant in the refrigeration-side refrigerant circuit 40a.

By virtue of the above configuration, in the air-conditioning-side refrigerant circuit 30a, various paths for the flow of refrigerant can be provided using the two flow switching devices, and the exhaust heat recovery path 31 on which the exhaust-heat recovery heat exchanger 6 is provided. Thus, even in the case where the cooling operation mode or defrosting operation mode is entered, heat exchange can be performed between the low-pressure refrigerant and the high-pressure refrigerant. Therefore, exhaust heat is effectively utilized to achieve energy saving operation of the entire apparatus.

The exhaust heat recovery type of air-conditioning apparatus 100a may further include the controller 50a which controls the air-conditioning-side refrigerant circuit 30a and the refrigeration-side refrigerant circuit 40a in accordance with the operation mode. Thereby, the air-conditioning-side refrigerant circuit 30a and the refrigeration-side refrigerant circuit 40a can be automatically controlled, and can also be cooperatively controlled to efficiently achieve exhaust-heat recovery.

The refrigeration-side refrigerant circuit 40a may further include the condenser 11 between the discharge side of the second compressor 10 and the cooler 12. Thereby, since the refrigeration apparatus 16a includes the condenser in addition to the exhaust-heat recovery heat exchanger 6, it can be independently operated even when the operation of the air-conditioning apparatus is in the stopped state.

The controller 50a may include: the frost formation determination unit 52 which determines whether or not the frost formation condition that it is detected that frost is formed at the outdoor heat exchanger 2 is satisfied in the heating operation in which the indoor heat exchanger 5 functions as a condenser; and the capacity determination unit 53 which determines whether or not the capacity condition that the condensation capacity of the air-conditioning-side refrigerant circuit 30a is smaller than the necessary evaporation capacity of the refrigeration-side refrigerant circuit 40a is satisfied in the heating operation. In the case where it is determined that the frost formation condition is not satisfied, and it is determined that the capacity condition is not satisfied, the controller 50a may control the first flow switching device 3 to cause the outdoor heat exchanger 2 and the suction side of the first compressor 1 to communicate with each other, and control the second flow switching device 4 to cause the indoor heat exchanger 5 and the discharge side of the first compressor 1 to communicate with each other. By virtue of this configuration, in the heating operation, exhaust heat can be recovered from the refrigeration apparatus 16a, and applied to the heating operation, and refrigeration efficiency of the refrigeration apparatus can be improved.

The capacity determination unit 53 may further determine whether or not the capacity threshold condition that the condensation capacity reaches the set threshold is satisfied in the heating operation. When it is determined that at least one of the frost formation condition and the capacity condition is satisfied and it is determined that the capacity threshold condition is not satisfied, the controller 50a may control the first flow switching device 3 to cause the outdoor heat exchanger 2 and the discharge side of the first compressor 1 to communicate with each other, and also control the second flow switching device 4 to cause the indoor heat exchanger 5 and the discharge side of the first compressor 1 to communicate with each other.

By virtue of the above configuration, in the case where the capacity of the air-conditioning apparatus is sufficient when formation of frost is detected in the heating operation, the air-conditioning apparatus performs the defrosting operation while maintaining the heating operation. Since capacity determination is made in addition to defrosting determination, the defrosting operation can be performed at any time at a timing at which a heating capacity is small and a refrigeration capacity is large, regardless of whether formation of frost is detected, and frost formation can be prevented while the heating operation is maintained. Furthermore, since the low-pressure refrigerant in the air-conditioning-side refrigerant circuit 30a flows to the exhaust-heat recovery heat exchanger 6, the air-conditioning apparatus can recover heat from the refrigeration apparatus 16a, and use the recovered heat in heating and defrosting. Since refrigerants having passed through the indoor heat exchanger 5 and the outdoor heat exchanger 2 join and flow into the exhaust-heat recovery heat exchanger 6, the flow rate of the refrigerant therein is high, as a result of which exhaust heat can be highly efficiently recovered.

The air-conditioning-side refrigerant circuit 30a may further include the second expansion device 8 which changes the flow rate of refrigerant flowing to the outdoor heat exchanger 2, and the second expansion device 8 and the first flow switching device 3 may be connected to each other by a pipe, with the outdoor heat exchanger 2 interposed between the second expansion device 8 and the first flow switching device 3. Thereby, the controller 50a can adjust the flow of refrigerant to the second expansion device 8, and cause the air-conditioning apparatus to perform various operations.

In the case where it is determined that at least one of the frost formation condition and the capacity condition is satisfied, and it is determined that the capacity threshold condition is satisfied, the controller 50a may control the first flow switching device 3 to cause the outdoor heat exchanger 2 and the suction side of the first compressor 1 to communicate with each other, control the second flow switching device 4 to cause the indoor heat exchanger 5 and the discharge side of the first compressor 1 to communicate with each other, and control the second expansion device 8 to be fully closed to stop circulation of refrigerant in the outdoor heat exchanger 2.

By virtue of the above configuration, in the heating operation, off-cycle defrosting can be performed without losing comfortability. Since low-pressure refrigerant having passed through the indoor heat exchanger 5 flows into the exhaust-heat recovery heat exchanger 6 without bifurcation, exhaust heat can be highly efficiently recovered from the refrigeration apparatus 16a.

The air-conditioning-side refrigerant circuit 30a may further include the third expansion device 9 which changes the flow rate of refrigerant flowing to the exhaust-heat recovery heat exchanger 6, and the third expansion device 9 and the suction side of the first compressor 1 may be connected to each other by the pipe, with the exhaust-heat recovery heat exchanger 6 interposed between the third expansion device 9 and the suction side of the first compressor 1. By virtue of this configuration, the controller 50a can adjust the flow of refrigerant to the exhaust-heat recovery heat exchanger 6, and perform control to cause a solo operation to be performed preferentially if exhaust heat recovery is unnecessary.

The controller 50a may include the capacity determination unit 53 which determines whether or not the capacity condition that the condensation capacity of the air-conditioning-side refrigerant circuit 30a is larger than the necessary evaporation capacity is satisfied in the cooling operation in which the indoor heat exchanger 5 functions as the evaporator. In the case where it is determined that the capacity condition is satisfied, the controller 50a may control the first flow switching device 3 to cause the outdoor heat exchanger 2 and the discharge side of the first compressor 1 to communicate with each other, control the second flow switching device 4 to cause the indoor heat exchanger 5 and the suction side of the first compressor 1 to communicate with each other, and control the third expansion device 9 to be opened. In the case where it is determined that the capacity condition is not satisfied, the controller 50a may control the first flow switching device 3 to cause the outdoor heat exchanger 2 and the discharge side of the first compressor 1 to communicate with each other, control the second flow switching device 4 to cause the indoor heat exchanger 5 and the suction side of the first compressor 1 to communicate with each other, and control the third expansion device 9 to be fully closed to stop circulation of refrigerant in the exhaust-heat recovery heat exchanger 6.

By virtue of the above configuration, in the cooling operation also, the low-pressure refrigerant can be made to flow to the exhaust-heat recovery heat exchanger 6 by a combination of two flow switching devices. Furthermore, since the capacity determination unit 53 and the operation control unit 51 cause paths to be provided in accordance with loads and capacities of the refrigeration apparatus 16a and the air-conditioning apparatus, the cooling function of the refrigeration apparatus 16a is increased in the case where the capacity of the air-conditioning apparatus is still sufficient, or the refrigerant circuits are disconnected from each other in the case where the capacity of the air-conditioning apparatus is not sufficient. Therefore, since unstable heat exchange is not performed, the air-conditioning apparatus can function in the same manner as an independent device, and maintain a necessary cooling capacity.

Embodiment 2

Figure 9:
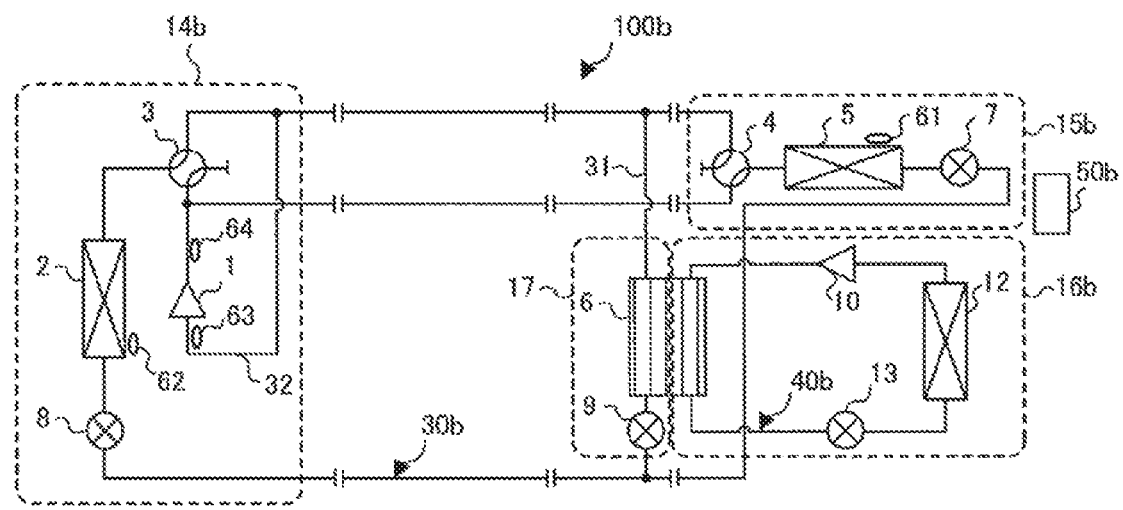
FIG. 9 is a schematic circuit diagram illustrating an exhaust heat recovery type of air-conditioning apparatus according to embodiment 2.

An exhaust heat recovery type of air-conditioning apparatus 100b will be described, which is obtained by omitting the condenser 11 from the exhaust heat recovery type of air-conditioning apparatus 100a according to embodiment 1. FIG. 9 is a schematic circuit diagram illustrating the exhaust heat recovery type of air-conditioning apparatus according to embodiment 2. A device configuration of the exhaust heat recovery type of air-conditioning apparatus 100b will be described with reference to FIG. 9.

(Device Configuration)

The exhaust heat recovery type of air-conditioning apparatus 100b according to embodiment 2 includes an air-conditioning-side refrigerant circuit 30b and a refrigeration-side refrigerant circuit 40b. In the refrigeration-side refrigerant circuit 40b, the second compressor 10, the exhaust-heat recovery heat exchanger 6, the refrigeration-side expansion device 13 and the cooler 12 are sequentially connected by refrigerant pipes. Components of the refrigerant circuits are mounted on, for example, an outdoor unit 14b, an air-conditioning indoor unit 15b, or a refrigeration apparatus 16b. In embodiment 2, the outdoor unit 14b includes the first compressor 1, the first flow switching device 3, the outdoor heat exchanger 2 and the second expansion device 8. The air-conditioning indoor unit 15b includes the indoor heat exchanger 5, the first expansion device 7 and the second flow switching device 4. The refrigeration apparatus 16b includes an exhaust heat recovery device 17 made up of the exhaust-heat recovery heat exchanger 6 and the third expansion device 9, the second compressor 10, the refrigeration-side expansion device 13 and the cooler 12.

In embodiment 2, the refrigeration apparatus 16b of the exhaust heat recovery type of air-conditioning apparatus 100b does not include a specific condenser. Thus, for the refrigeration apparatus 16b, an outdoor unit, that is, an outdoor exhaust heat device, does not need to be provided. For example, only a cooling unit can form the refrigeration apparatus. Thus, the refrigeration apparatus 16b can be made more compact. It should be noted that the exhaust-heat recovery heat exchanger 6 can be used as a condenser of the refrigeration apparatus 16b. The exhaust-heat recovery heat exchanger 6 includes a portion corresponding to an evaporator of the air-conditioning-side refrigerant circuit 30b and a portion corresponding to a condenser of the refrigeration-side refrigerant circuit 40b, whereby exhaust heat from the refrigeration apparatus 16b is recovered by the air-conditioning apparatus.

(Operation)

Figure 10:
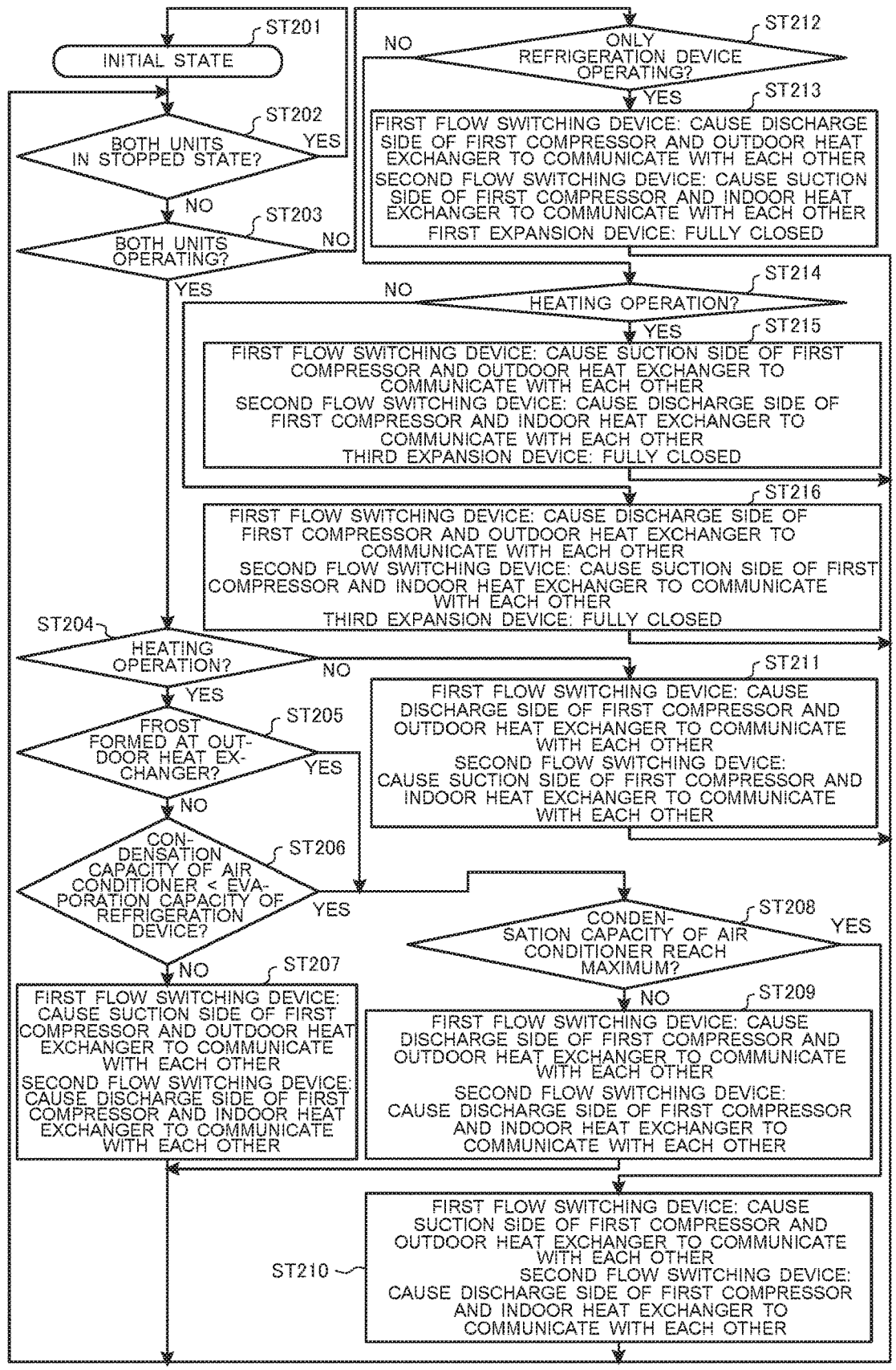
FIG. 10 is a flowchart illustrating a flow of steps of operation of the exhaust heat recovery type of air-conditioning apparatus according to embodiment 2.

FIG. 10 is a flowchart illustrating a flow of steps which are carried out when the exhaust heat recovery type of air-conditioning apparatus 100b according to embodiment 2 is operated. First, a controller 50b of the exhaust heat recovery type of air-conditioning apparatus 100b determines whether the operations of both units, i.e., the operations of the air-conditioning apparatus and the refrigeration apparatus 16b, are in a stopped state or not (step ST202). In the case where the operations of the above both units are in the stopped state (Yes in step ST202), the state of the controller 50b is returned to an initial state (step ST201). In the case where the operations of the both units are not in the stopped state, that is, the both units are operated (Yes in step ST203), the controller 50b determines whether the operation mode of the air-conditioning apparatus is the heating operation mode in which the heating operation is performed (step ST204).

(Operation in Heating Operation Mode)

Figure 11:
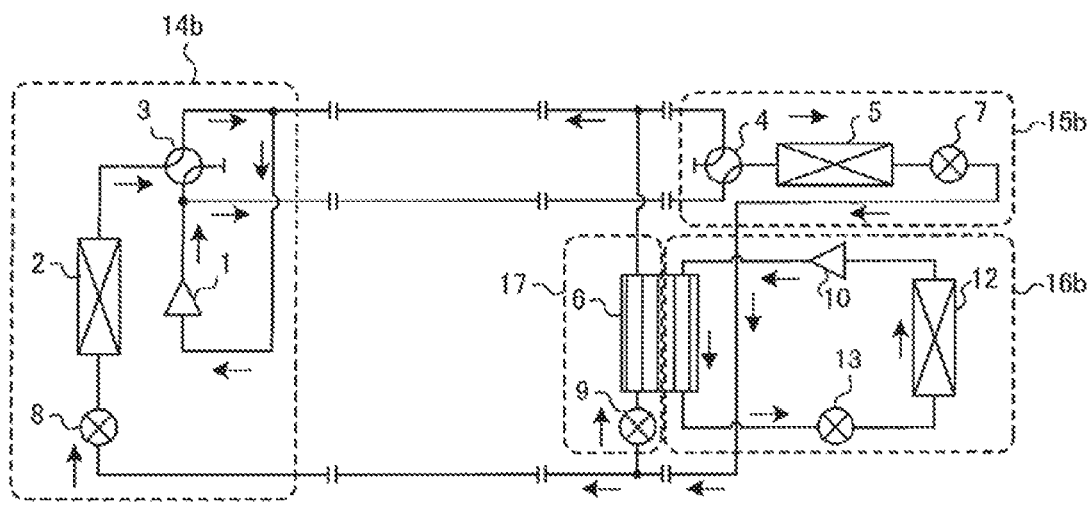
FIG. 11 is an explanatory diagram illustrating an example of the flow of refrigerant in a normal heating mode as indicated in FIG. 10, according to embodiment 2.
Figure 12:
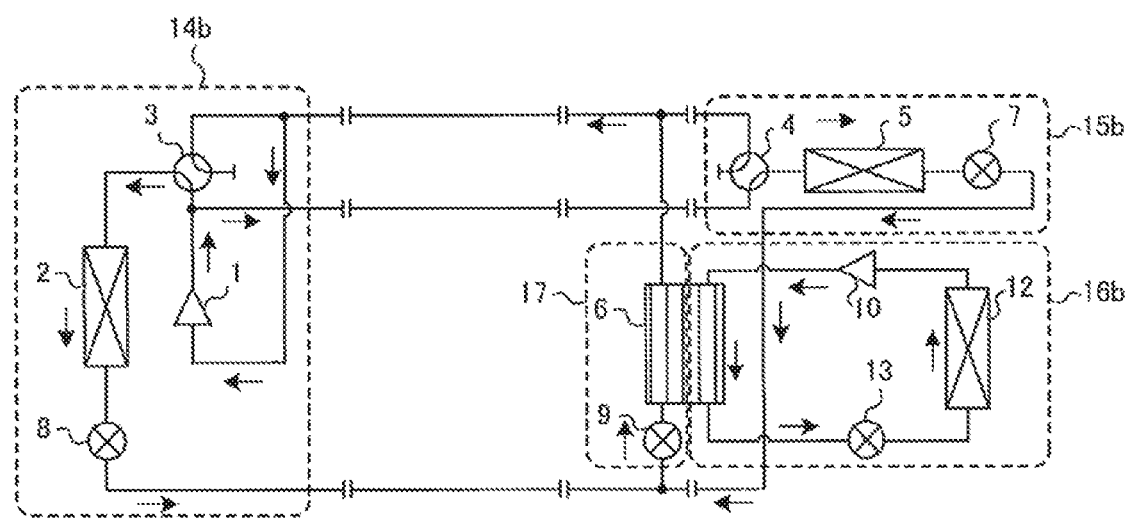
FIG. 12 is an explanatory diagram illustrating an example of the flow of refrigerant in a hot-gas defrost mode as indicated in FIG. 10, according to embodiment 2.
Figure 13:
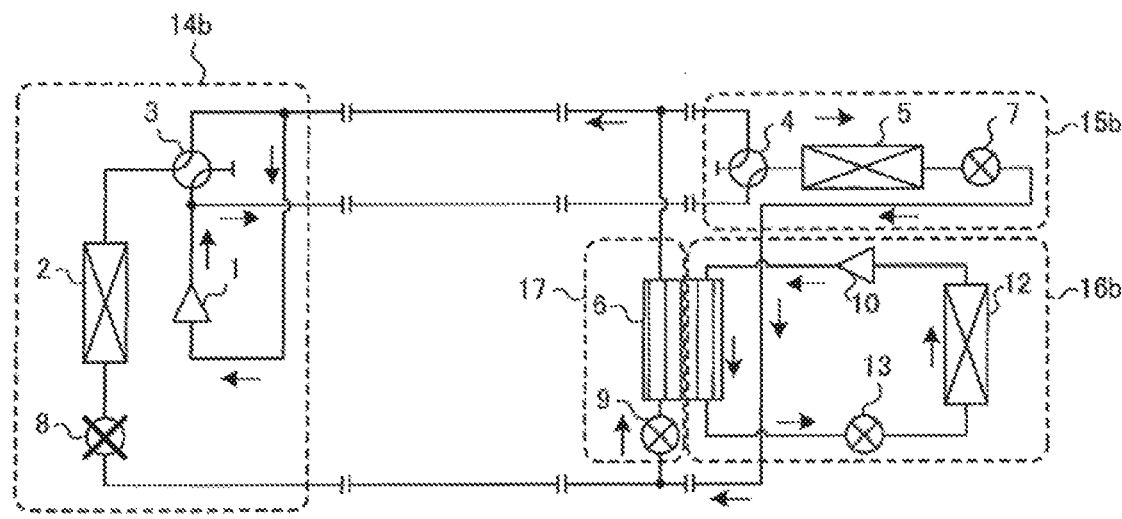
FIG. 13 is an explanatory diagram illustrating an example of the flow of refrigerant in an off-cycle defrost mode as indicated in FIG. 10, according to embodiment 2.

It will be explained with reference to FIGS. 10 to 13 what operation is performed in the case where the operation mode of the air-conditioning apparatus is the heating operation mode in which the heating operation is performed. FIG. 11 is an explanatory diagram illustrating an example of the flow of refrigerant flow in the normal heating mode as indicated in FIG. 10, according to embodiment 2. FIG. 12 is an explanatory diagram illustrating an example of the flow of refrigerant in the hot-gas defrost mode as indicated in FIG. 10, according to embodiment 2. FIG. 13 is an explanatory diagram illustrating an example of the flow of refrigerant in the off-cycle defrost mode as indicated in FIG. 10, according to embodiment 2.

In the case where the heating operation is being performed by the operation control unit 51 (Yes in step ST204), the frost formation determination unit 52 determines whether frost is formed at the outdoor heat exchanger 2 or not (step ST205). In the case where the condition to be checked in step ST205 is not satisfied (No in step ST205), the capacity determination unit 53 determines whether the condensation capacity of the air-conditioning apparatus is smaller than the necessary evaporation capacity of the refrigeration apparatus 16b or not (step ST206).

Subsequently, in the case where the frost formation condition to be checked in step ST205 is satisfied (Yes in step ST205), the capacity determination unit 53 further determines whether the condensation capacity of the air-conditioning apparatus reaches the upper limit or not (step ST208). Also, in the case where the capacity condition to be checked in step ST206 is satisfied (Yes in step ST206), the capacity determination unit 53 proceeds to step ST208 to make a determination to be done therein. In the case where neither the capacity condition nor the frost formation condition is satisfied (No in step ST206), the operation control unit 51 causes the normal heating mode to be entered, by controlling the first flow switching device 3 and the second flow switching device 4 as illustrated in FIG. 11 (step ST207). Specifically, the first flow switching device 3 causes the refrigerant suction side of the first compressor 1 and the outdoor heat exchanger 2 to communicate with each other, and the second flow switching device 4 causes the refrigerant discharge side of the first compressor 1 and the indoor heat exchanger 5 to communicate with each other. Therefore, the outdoor heat exchanger 2 functions as the evaporator, and the indoor heat exchanger 5 functions as the condenser. The exhaust-heat recovery heat exchanger 6 functions as the evaporator of the air-conditioning-side refrigerant circuit 30b. To be more specific, in the heating operation, the controller 50b causes low-pressure refrigerant in the air-conditioning-side refrigerant circuit 30b and high-pressure refrigerant in the refrigeration-side refrigerant circuit 40b to flow into the exhaust-heat recovery heat exchanger 6, to thereby recover exhaust heat from the refrigeration apparatus 16b.

In the case where the condensation capacity of the air-conditioning apparatus is smaller than the necessary evaporation capacity of the refrigeration apparatus 16*b* (Yes in step ST206), the capacity determination unit 53 determines whether or not the air-conditioning apparatus is operated, with the condensation capacity exceeding the condensation capacity upper limit (step ST208). Furthermore, in the case where frost is formed at the outdoor heat exchanger 2 (Yes in step ST205), the controller 50*b* also proceeds to step ST208 (Yes in step ST205).

When it is determined in step ST208 that the condensation capacity is smaller than the condensation capacity upper limit, that is, the capacity of the air-conditioning apparatus is still sufficient (No in step ST208), the operation control unit 51 causes the hot-gas defrost mode to be entered, by controlling the first flow switching device 3 and the second flow switching device 4 as illustrated in FIG. 12. To be more specific, the first flow switching device 3 causes the refrigerant discharge side of the first compressor 1 and the outdoor heat exchanger 2 to communicate with each other, and the second flow switching device 4 causes the refrigerant discharge side of the first compressor 1 and the indoor heat exchanger 5 to communicate with each other (step ST209). Thereby, the outdoor heat exchanger 2 and the indoor heat exchanger 5 both function as condensers, heating in the room is maintained, and high-temperature refrigerant flows to the outdoor heat exchanger 2 to perform defrosting thereof. The exhaust-heat recovery heat exchanger 6 functions as the evaporator of the air-conditioning-side refrigerant circuit 30*b*, and recovers exhaust heat from the refrigeration apparatus 16*b*.

In the case where the air-conditioning apparatus is operated, with the condensation capacity exceeding the condensation capacity upper limit (Yes in step ST208), that is, in the case where an air conditioning load is great with respect to the capacity of the air-conditioning apparatus, and the condensation capacity is not sufficient, the operation control unit 51 causes the off-cycle defrost mode to be entered, by controlling the first flow switching device 3, the second flow switching device 4 and the second expansion device 8 as illustrated in FIG. 13. To be more specific, the first flow switching device 3 causes the refrigerant suction side of the first compressor 1 and the outdoor heat exchanger 2 to communicate with each other, the second flow switching device 4 causes the refrigerant discharge side of the first compressor 1 and the indoor heat exchanger 5 to communicate with each other, and the second expansion device 8 is fully closed (step ST210). Thereby, the indoor heat exchanger 5 functions as a condenser and the heating operation is continued, and the low-temperature refrigerant does not flow to the outdoor heat exchanger 2. The exhaust-heat recovery heat exchanger 6 functions as the evaporator of the air-conditioning-side refrigerant circuit 30*b*, and the air-conditioning apparatus recovers exhaust heat from the refrigeration apparatus 16*b*.

(Operation in Cooling Operation Mode)

Figure 14:
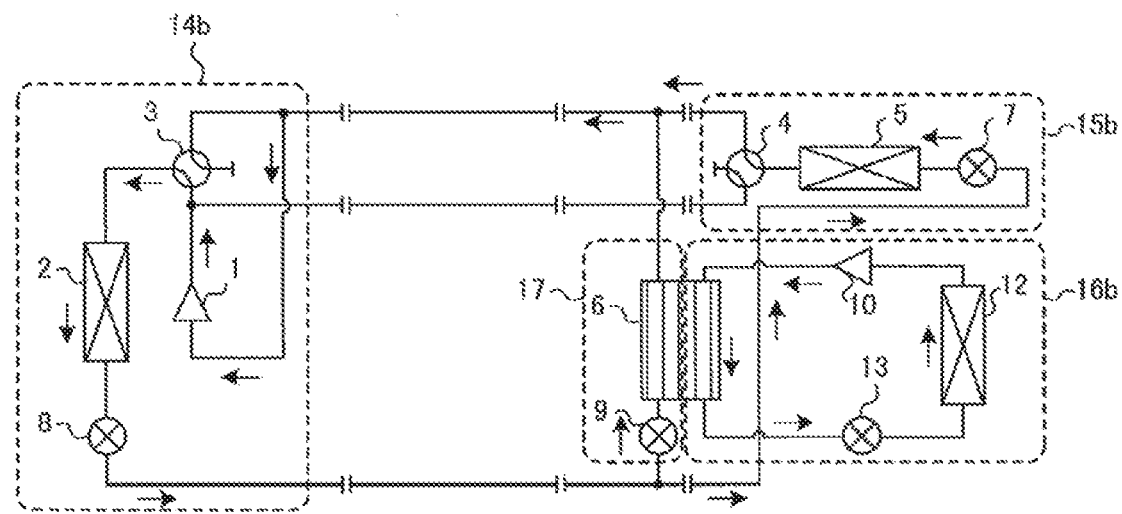
FIG. 14 is an explanatory diagram illustrating an example of the flow of refrigerant in a normal cooling mode as indicated in FIG. 10, according to embodiment 2.

It will be explained with reference to FIGS. 10 and 14 what operation is performed in a cooling operation mode in which the air-conditioning apparatus performs the cooling operation. FIG. 14 is an explanatory diagram illustrating an example of the flow of refrigerant in the normal cooling mode as indicated in FIG. 10, according to embodiment 2. In FIG. 14, flows of refrigerant are indicated by arrows, and an expansion device instructed to be fully closed is marked with a cross.

In the case the operation mode of the air-conditioning apparatus is the cooling operation mode in which the cooling operation is performed (No in step ST204), the operation control unit 51 causes the normal cooling mode to be entered, by controlling the first flow switching device 3 and the second flow switching device 4 as illustrated in FIG. 14. The first flow switching device 3 is switched to cause the refrigerant discharge side of the first compressor 1 and the outdoor heat exchanger 2 to communicate with each other, and the second flow switching device 4 is switched to cause the refrigerant suction side of the first compressor 1 and the indoor heat exchanger 5 to communicate with each other (step ST211).

Thereby, in the air-conditioning-side refrigerant circuit 30*b*, the outdoor heat exchanger 2 functions as the condenser, and the indoor heat exchanger 5 functions as the evaporator. The exhaust-heat recovery heat exchanger 6 functions as the evaporator, and the air-conditioning apparatus recovers exhaust heat from the refrigeration apparatus 16*b*. In this case, the refrigeration apparatus 16*b* can be highly efficiently operated by dual operation of the air-conditioning-side refrigerant circuit 30*b* and the refrigeration-side refrigerant circuit 40*b*. It should be noted that by determining the capacities of the first compressor 1 and the outdoor heat exchanger 2 in consideration of the above operation state, it is possible to make the air-conditioning apparatus have a condensation capacity which can compensate for a load on the refrigeration apparatus 16*b* in simultaneous operation of cooling by the air-conditioning apparatus and cooling by the refrigeration apparatus 16*b*.

(Solo Operation)

Figure 15:
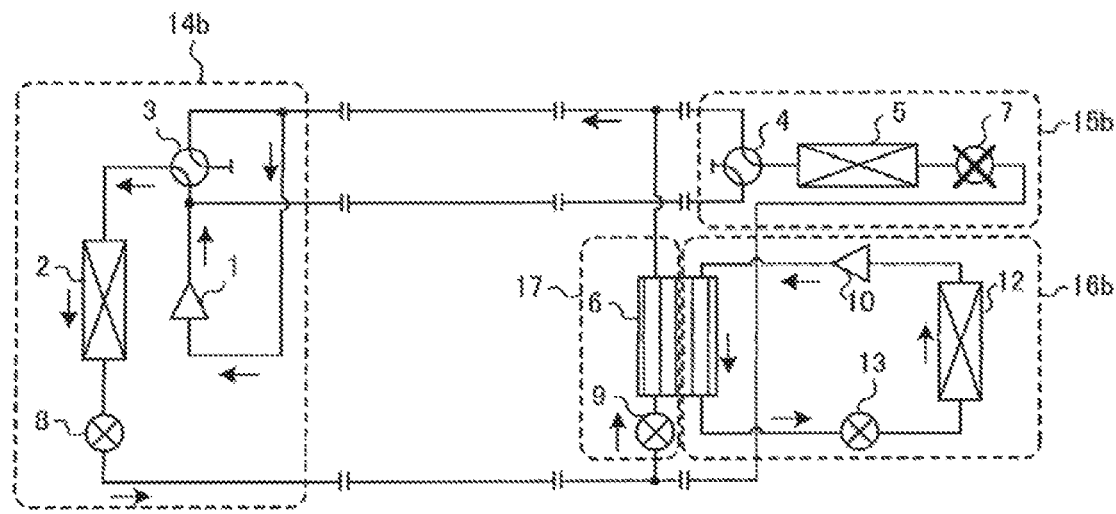
FIG. 15 is an explanatory diagram illustrating an example of the flow of refrigerant in a cooling auxiliary mode as indicated in FIG. 10, according to embodiment 2.
Figure 16:
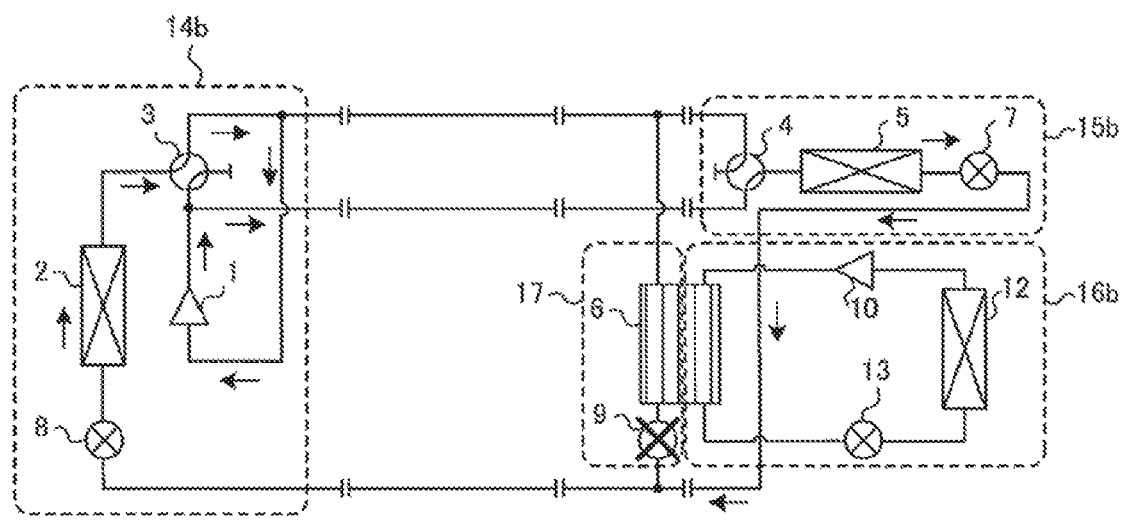
FIG. 16 is an explanatory diagram illustrating an example of the flow of refrigerant in a solo heating mode as indicated in FIG. 10, according to embodiment 2.
Figure 17:
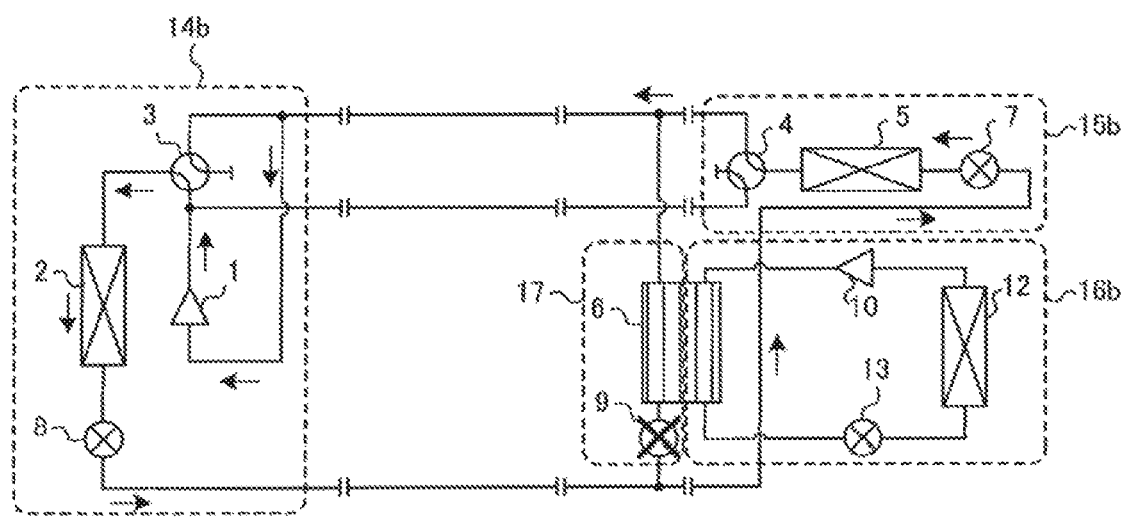
FIG. 17 is an explanatory diagram illustrating an example of the flow of refrigerant in the solo cooling mode as indicated in FIG. 10, according to embodiment 2.

With reference to FIGS. 15 to 17, the following description is made regarding a solo operation in which the refrigeration apparatus 16*b* and the air-conditioning apparatus are not simultaneously operated (No in step ST203), that is, only one of the cooling by the refrigeration apparatus 16*b* and the air conditioning by the air-conditioning apparatus is performed. FIG. 15 is an explanatory diagram illustrating an example of the flow of refrigerant in a cooling auxiliary mode in FIG. 10 according to embodiment 2. When only the refrigeration apparatus 16*b* is operated (Yes in step ST212), the operation control unit 51 causes the cooling auxiliary mode to be entered, by controlling the first flow switching device 3, the second flow switching device 4 and the first expansion device 7 as illustrated in FIG. 15. To be more specific, the first flow switching device 3 causes the refrigerant discharge side of the first compressor 1 and the outdoor heat exchanger 2 to communicate with each other, the second flow switching device 4 causes the refrigerant suction side of the first compressor 1 and the indoor heat exchanger 5 to communicate with each other, and the first expansion device 7 is fully closed (step ST213).

Thereby, in the air-conditioning-side refrigerant circuit 30*b*, the outdoor heat exchanger 2 functions as the condenser, and no refrigerant is circulated in the indoor heat exchanger 5. The exhaust-heat recovery heat exchanger 6 functions as the evaporator of the air-conditioning-side refrigerant circuit 30*b*, and recovers exhaust heat from the refrigeration apparatus 16*b*. At this time, air-conditioning by the air-conditioning apparatus is in a stopped state, but the controller 50*b* causes the first compressor 1 to be operated in accordance with the operation of the refrigeration apparatus 16*b*, and causes the dual operation to be performed. As a result, the refrigeration apparatus 16*b* can be highly efficiently operated.

FIG. 16 is an explanatory diagram illustrating an example of the flow of refrigerant in a solo heating mode as indicated in FIG. 10, according to embodiment 2. In the case where only the air-conditioning apparatus is operated (No in step ST212), that is, in the case where cooling by the refrigeration apparatus 16b is not performed, and the heating operation is performed (Yes in step ST214), the operation control unit 51 causes the solo heating mode to be entered, by controlling the first flow switching device 3, the second flow switching device 4 and the third expansion device 9 as illustrated in FIG. 16. To be more specific, the first flow switching device 3 causes the refrigerant suction side of the first compressor 1 and the outdoor heat exchanger 2 to communicate with each other, and the second flow switching device 4 causes the refrigerant discharge side of the first compressor 1 and the indoor heat exchanger 5 to communicate with each other, and the third expansion device 9 is fully closed (step ST215).

Thereby, in the air-conditioning-side refrigerant circuit 30b, the outdoor heat exchanger 2 functions as the evaporator, and the indoor heat exchanger 5 functions as a condenser. Since the third expansion device 9 is closed, refrigerant is not circulated in the exhaust-heat recovery heat exchanger 6. This configuration is provided for the reason that in the solo heating mode, the operation of the refrigeration apparatus 16b is in the stopped state, and it is not necessary to recover exhaust heat. Accordingly, the controller 50b can ensure the flow rate of refrigerant in the indoor heat exchanger 5.

FIG. 17 is an explanatory diagram illustrating an example of refrigerant in the solo cooling mode as indicated in FIG. 10, according to embodiment 2. When only the air-conditioning apparatus is operated (No in step ST212), and in the case where the cooling operation is performed (No in step ST214), the operation control unit 51 causes the solo cooling mode to be entered, by controlling the first flow switching device 3, the second flow switching device 4 and the third expansion device 9 as illustrated in FIG. 17. To be more specific, the first flow switching device 3 causes the refrigerant discharge side of the first compressor 1 and the outdoor heat exchanger 2 to communicate with each other, the second flow switching device 4 causes the refrigerant suction side of the first compressor 1 and the indoor heat exchanger 5 to communicate with each other, and the third expansion device 9 is fully closed (step ST216).

Thereby, in the air-conditioning-side refrigerant circuit 30b, the outdoor heat exchanger 2 functions as the condenser, and the indoor heat exchanger 5 functions as the evaporator. In this case, since the operation of the refrigeration apparatus 16b is in the stopped state, and it is not necessary to recover exhaust heat, refrigerant does not flow to the exhaust-heat recovery heat exchanger 6.

After, for example, the control in step ST207, ST209, ST210, ST211, ST213, ST215, or ST216 is performed in simultaneous operation or solo operation of the air-conditioning apparatus and/or the refrigeration apparatus 16b, the controller 50b returns to step ST202 and repeats step ST202 and the subsequent steps.

The operation control unit 51 adjusts expansion opening degrees of the first expansion device 7, the second expansion device 8e and the third expansion device 9, and perform control such that refrigerant becomes liquid refrigerant having a predetermined degree of supercooling, at a refrigerant pipe part where an intermediate pressure is set between pressures at two expansion stages to which expansion devices are connected. However, in the case where an expansion device is instructed to be fully closed, it is fully closed in response to the instruction.

The controller 50b adjusts the condensation capacity such that a predetermined degree of supercooling is reached at the inlet of the refrigeration-side expansion device 13 in the refrigeration apparatus 16b. It should be noted that in the case where a predetermined degree of supercooling is not reached even when the refrigeration-side expansion device 13 is fully opened at a predetermined opening degree, the refrigeration apparatus 16b is requested to exchange heat with the air-conditioning apparatus. The controller 50b can control the air-conditioning-side refrigerant circuit 30b and the refrigeration-side refrigerant circuit 40b in association with each other, by detecting, for example, the degree of superheat at the outlet of the exhaust-heat recovery heat exchanger 6 in the air-conditioning-side refrigerant circuit 30b. By virtue of such control, the exhaust-heat recovery heat exchanger 6 recovers condensation exhaust heat from the refrigeration apparatus 16b as the evaporator of the air-conditioning apparatus, the recovered exhaust heat is used as a heat source for heating of air conditioning or defrosting, and the capacity of the condenser of the air-conditioning apparatus, which is still sufficient, is used to augment the condensation capacity of the refrigeration apparatus, whereby an energy saving operation can be performed.

In embodiment 2, the second flow switching device 4 is provided close to the indoor heat exchanger 5; however, it may be provided in the outdoor unit 14b, not in the air-conditioning indoor unit 15b. Furthermore, a plurality of air-conditioning indoor units 15b may be provided at a stage subsequent to the second flow switching device 4. In addition, a plurality of air-conditioning indoor units 15b may be each made up of a second flow switching device 4, an indoor heat exchanger 5 and a first expansion device 7, and may be connected in parallel to each other. In particular, in the case where the second flow switching device 4 is provided on an indoor side, the exhaust-heat recovery heat exchanger 6 and the refrigeration apparatus 16b can be formed as a single structure, and short pipes can be used for the air-conditioning apparatus, and can be also disposed in an indoor space only.

In the cooling operation in which the indoor heat exchanger 5 functions as the evaporator, the controller 50b may control the first flow switching device 3 to cause the outdoor heat exchanger 2 and the discharge side of the first compressor 1 to communicate with each other, and control the second flow switching device 4 to cause the indoor heat exchanger 5 and the suction side of the first compressor 1 to communicate with each other. Thereby, the refrigeration apparatus 16b can obtain a cooling capacity by exchanging heat with the air-conditioning apparatus, even if it does not include a specific condenser.

As described above, in embodiment 2, in the cooling operation in which the indoor heat exchanger 5 functions as the evaporator, the controller 50b may control the first flow switching device 3 to cause the outdoor heat exchanger 2 and the discharge side of the first compressor 1 to communicate with each other, and control the second flow switching device 4 to cause the indoor heat exchanger 5 and the suction side of the first compressor 1 to communicate with each other. In the configuration of embodiment 2, the exhaust-heat recovery heat exchanger 6 can be used as the condenser of the refrigeration apparatus 16b, and thus a specific condenser is not provided, as a result of which the outdoor unit 14b can be made more compact. Therefore, even if the refrigeration apparatus 16b does not have a specific condenser, in the solo operation thereof, low-pressure refrigerant in the air-conditioning-side refrigerant circuit 30b is made to flow into the exhaust-heat recovery heat exchanger 6, thereby enabling the refrigeration efficiency to be increased.

Furthermore, it may be set that in the solo operation of the refrigeration-side refrigerant circuit 40*b* in which circulation of refrigerant in the indoor heat exchanger 5 is stopped, the controller 50*b* controls the first flow switching device 3 to cause the outdoor heat exchanger 2 and the discharge side of the first compressor 1 to communicate with each other, controls the second flow switching device 4 to cause the indoor heat exchanger 5 and the suction side of the first compressor 1 to communicate with each other, and causes the first expansion device 7 to be fully closed. Thereby, even if the refrigeration apparatus 16*b* does not have a specific condenser, in the case where air-conditioning is not performed by the air-conditioning apparatus, the air-conditioning-side refrigerant circuit 30*b* is operated, and heat exchange is performed, thereby enabling the cooling efficiency to be increased.

The air-conditioning-side refrigerant circuit 30*b* may further include the third expansion device 9 which changes the flow rate of refrigerant flowing to the exhaust-heat recovery heat exchanger 6, and the third expansion device 9 and the suction side of the first compressor 1 may be connected to each other, with the exhaust-heat recovery heat exchanger 6 interposed between the third expansion device 9 and the suction side of the first compressor 1. Thereby, the controller 50*b* can adjust the flow of refrigerant to the exhaust-heat recovery heat exchanger 6 by controlling the third expansion device 9.

In the solo operation of the air-conditioning-side refrigerant circuit 30*b* in which circulation of refrigerant in the cooler 12 is stopped, the controller 50*b* may cause the third expansion device 9 to be fully closed to stop circulation of refrigerant in the exhaust-heat recovery heat exchanger 6. Thereby, in the case where the operation of the refrigeration apparatus 16*b* is in the stopped state, and exhaust heat cannot be recovered, no refrigerant flows to the exhaust-heat recovery heat exchanger 6, and heat exchange between refrigerants is not performed, as a result of which the air-conditioning apparatus can obtain an air-conditioning capacity equivalent to that of an independent air-conditioning apparatus. Furthermore, unlike the exhaust heat recovery type of air-conditioning apparatuses of related art, refrigerant does not pass through an unnecessary path or paths, and thus unstable heat transfer does not occur. Therefore, the outdoor heat exchanger 2 does not need to be designed in size in consideration of (この差?) a safety factor, and the outdoor heat exchanger 2 can be made more compact.

With respect to embodiment 2, it is described that the exhaust-heat recovery heat exchanger 6 functions as the evaporator of the air-conditioning apparatus; however, this is not limitative. For example, the exhaust-heat recovery heat exchanger 6 according to embodiment 2 may be used as a condenser for use in, for example, hot-water supply, or may be applied to an evaporation-condensation switching heat exchanger. The number of the outdoor units 14*a* and 14*b*, the air-conditioning indoor units 15*a* and 15*b* and the refrigeration apparatuses 16*a* and 16*b* and the number of structural components mounted thereon are not limited to those described above with respect to embodiment 2. In addition, it may be determined on which of the units each of the structural components is to be mounted in accordance with usage of the air-conditioning apparatus and the refrigeration apparatuses 16*a* and 16*b*.

REFERENCE SIGNS LIST

1 first compressor 2 outdoor heat exchanger 3 first flow switching device 4 second flow switching device 5 indoor heat exchanger 6 exhaust-heat recovery heat exchanger 7 first expansion device 8 second expansion device 9 third expansion device 10 second compressor 11 condenser 12 cooler 13 refrigeration-side expansion device 14*a*, 14*b* outdoor unit 15*a*, 15*b* air-conditioning indoor unit 16*a*, 16*b* refrigeration apparatus 17 exhaust heat recovery device 30*a*, 30*b* air-conditioning-side refrigerant circuit 31 exhaust heat recovery path 32 compressor path 40*a*, 40*b* refrigeration-side refrigerant circuit 50*a*, 50*b* controller 51 operation control unit 52 frost formation determination unit 53 capacity determination unit 61 to 64 sensor 100*a*, 100*b* exhaust heat recovery type of air-conditioning apparatus.

The invention claimed is:

1. An exhaust heat recovery type of air-conditioning apparatus comprising:
   an air-conditioning-side refrigerant circuit in which a first compressor, a first flow switching valve, an outdoor heat exchanger, a first expansion valve, an indoor heat exchanger and a second flow switching valve are connected by pipes, and an exhaust-heat recovery heat exchanger is connected in parallel to the outdoor heat exchanger and the indoor heat exchanger by pipes; and
   a refrigeration-side refrigerant circuit in which a second compressor, the exhaust-heat recovery heat exchanger, a refrigeration-side expansion valve and a cooler are connected by pipes,
   wherein the first flow switching valve is provided between the outdoor heat exchanger and the exhaust-heat recovery heat exchanger and causes the outdoor heat exchanger to communicate with one of a discharge side and a suction side of the first compressor through an associated one of the pipes,
   the second flow switching valve is provided between the indoor heat exchanger and the exhaust-heat recovery heat exchanger and causes the indoor heat exchanger to communicate with one of the discharge and suction sides of the first compressor through an associated one of the pipes, and
   the exhaust-heat recovery heat exchanger is connected to the suction side of the first compressor by a pipe in the air-conditioning-side refrigerant circuit and causes heat exchange to be performed between refrigerant in the air-conditioning-side refrigerant circuit and refrigerant in the refrigeration-side refrigerant circuit.

2. The exhaust heat recovery type of air-conditioning apparatus of claim 1, further comprising a controller configured to control the air-conditioning-side refrigerant circuit and the refrigeration-side refrigerant circuit in accordance with an operation mode.

3. The exhaust heat recovery type of air-conditioning apparatus of claim 2, wherein in a cooling operation in which the indoor heat exchanger functions as the evaporator, the controller controls the first flow switching valve to cause the outdoor heat exchanger and the discharge side of the first compressor to communicate with each other and controls the second flow switching valve to cause the indoor heat exchanger and the suction side of the first compressor to communicate with each other.

4. The exhaust heat recovery type of air-conditioning apparatus of claim 2, wherein in a solo operation of the refrigeration-side refrigerant circuit in which circulation of refrigerant in the indoor heat exchanger is stopped, the controller controls the first flow switching valve to cause the outdoor heat exchanger and the discharge side of the first compressor to communicate with each other, controls the second flow switching valve to cause the indoor heat exchanger and the suction side of the first compressor to communicate with each other and causes the first expansion valve to be fully closed.

5. The exhaust heat recovery type of air-conditioning apparatus of claim 2, wherein the air-conditioning-side refrigerant circuit further includes a third expansion valve configured to change a flow rate of refrigerant flowing to the exhaust-heat recovery heat exchanger, and the third expansion valve and the suction side of the first compressor are connected to each other by an associated one of the pipes, with the exhaust-heat recovery heat exchanger interposed between the third expansion valve and the suction side of the first compressor.

6. The exhaust heat recovery type of air-conditioning apparatus of claim 5, wherein in a solo operation of the air-conditioning-side refrigerant circuit in which circulation of refrigerant in the cooler is stopped, the controller causes the third expansion valve to be fully closed to stop circulation of refrigerant in the exhaust-heat recovery heat exchanger.

7. The exhaust heat recovery type of air-conditioning apparatus of claim 2, wherein the refrigeration-side refrigerant circuit further includes a condenser between a discharge side of the second compressor and the cooler.

8. The exhaust heat recovery type of air-conditioning apparatus of claim 2, wherein the controller is configured to
determine whether or not a frost formation condition that it is detected that frost is formed at the outdoor heat exchanger is satisfied in a heating operation in which the indoor heat exchanger functions as a condenser,
determine whether or not a capacity condition that a condensation capacity of the air-conditioning-side refrigerant circuit is smaller than a necessary evaporation capacity of the refrigeration-side refrigerant circuit is satisfied in the heating operation, and
when it is determined that the frost formation condition is not satisfied and it is determined that the capacity condition is not satisfied, the controller controls the first flow switching valve to cause the outdoor heat exchanger and the suction side of the first compressor to communicate with each other and controls the second flow switching valve to cause the indoor heat exchanger and the discharge side of the first compressor to communicate with each other.

9. The exhaust heat recovery type of air-conditioning apparatus of claim 8, wherein
the controller is further configured to determine whether or not a capacity threshold condition that the condensation capacity reaches a set threshold is satisfied in the heating operation, and
when it is determined that at least one of the frost formation condition and the capacity condition is satisfied and it is determined that the capacity threshold condition is not satisfied, the controller controls the first flow switching valve to cause the outdoor heat exchanger and the discharge side of the first compressor to communicate with each other and controls the second flow switching valve to cause the indoor heat exchanger and the discharge side of the first compressor to communicate with each other.

10. The exhaust heat recovery type of air-conditioning apparatus of claim 9, wherein the air-conditioning-side refrigerant circuit further includes a second expansion valve configured to change a flow rate of refrigerant flowing to the outdoor heat exchanger, and the second expansion valve and the first flow switching valve are connected to each other by an associated one of the pipes, with the outdoor heat exchanger interposed between the second expansion valve and the first flow switching valve.

11. The exhaust heat recovery type of air-conditioning apparatus of claim 10, wherein when it is determined that at least one of the frost formation condition and the capacity condition is satisfied and it is determined that the capacity threshold condition is satisfied, the controller controls the first flow switching valve to cause the outdoor heat exchanger and the suction side of the first compressor to communicate with each other, controls the second flow switching valve to cause the indoor heat exchanger and the discharge side of the first compressor to communicate with each other and causes the second expansion valve to be fully closed to stop circulation of refrigerant in the outdoor heat exchanger.

12. The exhaust heat recovery type of air-conditioning apparatus of claim 7, wherein the air-conditioning-side refrigerant circuit further includes a third expansion valve configured to change a flow rate of refrigerant flowing to the exhaust-heat recovery heat exchanger, and the third expansion valve and the suction side of the first compressor are connected to each other by an associated one of the pipes, with the exhaust-heat recovery heat exchanger interposed between the third expansion valve and the suction side of the first compressor.

13. The exhaust heat recovery type of air-conditioning apparatus of claim 12, wherein
the controller is configured to determine whether or not a capacity condition that a condensation capacity of the air-conditioning-side refrigerant circuit is larger than a necessary evaporation capacity is satisfied in a cooling operation in which the indoor heat exchanger functions as an evaporator,
when it is determined that the capacity condition is satisfied, the controller controls the first flow switching valve to cause the outdoor heat exchanger and the discharge side of the first compressor to communicate with each other, controls the second flow switching valve to cause the indoor heat exchanger and the suction side of the first compressor to communicate with each other and causes the third expansion valve to be opened, and
when it is determined that the capacity condition is not satisfied, the controller controls the first flow switching valve to cause the outdoor heat exchanger and the discharge side of the first compressor to communicate with each other, controls the second flow switching valve to cause the indoor heat exchanger and the suction side of the first compressor to communicate with each other and causes the third expansion valve to be fully closed to stop circulation of refrigerant in the exhaust-heat recovery heat exchanger.

* * * * *